(12) United States Patent
Lopez et al.

(10) Patent No.: US 6,856,104 B2
(45) Date of Patent: Feb. 15, 2005

(54) HIGH VOLTAGE SUPPLY FOR A PICTURE TUBE

(75) Inventors: Daniel Lopez, Villingen-Schwenningen (DE); Jean-Paul Louvel, Brigachtal (DE); Martin Läufer, Villingen-Schwenningen (DE)

(73) Assignee: Thomson Licensing S.A., Boulogne (FR)

( * ) Notice: Subject to any disclaimer, the term of this patent is extended or adjusted under 35 U.S.C. 154(b) by 5 days.

(21) Appl. No.: 10/470,798

(22) PCT Filed: Jan. 21, 2002

(86) PCT No.: PCT/EP02/00544
§ 371 (c)(1),
(2), (4) Date: Jul. 30, 2003

(87) PCT Pub. No.: WO02/062051
PCT Pub. Date: Aug. 8, 2002

(65) Prior Publication Data
US 2004/0075403 A1 Apr. 22, 2004

(30) Foreign Application Priority Data
Jan. 30, 2001 (EP) .............................. 01102026

(51) Int. Cl.⁷ .................................. H01J 29/52
(52) U.S. Cl. ....................... 315/405; 315/381
(58) Field of Search ................. 315/405, 411, 315/381, 382, 375, 376, 379, 10, 31 R

(56) References Cited

U.S. PATENT DOCUMENTS

| | | | |
|---|---|---|---|
| 4,356,435 A | * 10/1982 | Kalmanash | ............ 315/375 |
| 4,442,451 A | 4/1984 | Kalmanash et al. | .......... 358/73 |
| 4,476,485 A | * 10/1984 | Kalmanash | .................. 348/382 |
| 4,626,737 A | 12/1986 | Takenaka et al. | ........... 313/402 |
| 4,626,977 A | * 12/1986 | Carnes et al. | ............. 363/21.09 |
| 4,658,342 A | * 4/1987 | Wharton | ................... 363/21.04 |
| 4,737,853 A | * 4/1988 | Graves et al. | .............. 348/730 |
| 4,766,390 A | * 8/1988 | Wharton et al. | .............. 327/44 |

* cited by examiner

*Primary Examiner*—Don Wong
*Assistant Examiner*—Chuc Tran
(74) *Attorney, Agent, or Firm*—Joseph S. Tripoli; Harvey D. Fried; Sammy S. Henig

(57) ABSTRACT

The high voltage supply for a picture tube comprises a high voltage transformer, which generates the anode voltage of the picture tube, and a high voltage module with a switched mode power supply for providing a grid voltage, which is higher than the anode voltage. The output of the high voltage transformer is coupled to the transformer of the switched mode power supply, for adding the output voltage of the switched mode power supply to the high voltage of the high voltage transformer. Preferably, the transformer of the switched mode power supply provides the high voltage isolation, and at least the high voltage part of the module including the transformer is potted with a resin. The high voltage module provides advantageously also an output for a connection to the anode of the picture tube, so that the module can be used with present high voltage transformers, without requiring any modification. The primary side of the switched mode power supply comprises a control stage with adjustable means for setting a specific output voltage of the power supply. In a preferred embodiment, this output voltage is adjustable between 300 and 500 Volts, with respect to the high voltage of the high voltage transformer.

10 Claims, 2 Drawing Sheets

HIGH VOLTAGE SUPPLY FOR A PICTURE TUBE

This application claims the benefit under 35 U.S.C. § 365 of International Application PCT/EP02/00544 filed Jan. 21, 2002, which claims the benefit of European Application No. 01102026.0 filed Jan. 30, 2001.

FIELD OF THE INVENTION

The invention relates to a high voltage supply for a picture tube, as used for example within a television set or a computer monitor. Picture tubes of this kind comprise an anode, to which a high voltage provided by a high voltage transformer is coupled, which is in the range of about 20–35 kV for color picture tubes. Further, several grid voltages, which are well below the high voltage of the anode for the picture tube, are required for focusing of the electron beams.

BACKGROUND OF THE INVENTION

A high voltage supply of this kind is known for example from EP 0 696 134 B1, which discloses a high voltage supply providing an anode voltage and several grid voltages. It comprises a high voltage transformer with a driver stage, which is coupled to the horizontal deflection stage of the picture tube. One of the secondary windings of the high voltage transformer is the high voltage winding, which comprises usually several high voltage diodes, arranged in a diode split configuration, for providing the high voltage. Additional grid voltages are provided by voltage divider chains, coupled either to the output voltage of the high voltage winding or to an intermediate tap of the high voltage winding.

A new kind of picture tube, known as "eagle picture tube", requires a supplementary mask voltage, which is higher than the anode voltage. Like conventional picture tubes the eagle picture tube has a shadow mask, but with the difference that this one is composed of two planes separated by a few $1/100$ of mm. By applying a voltage of a few 100 Volts across the two planes this mask is able to focus more electrons through the holes of the mask, therefore reducing the number of electrons landing into the metal of the mask and increasing the light transmission. Because the mask is working at the EHT voltage, over 30 kV, a second voltage source referenced to the anode voltage has to deliver the few 100 Volts necessary to obtain the optimum focusing effect.

Considering the technologies and currents involved in the EHT generation, solutions based on resistor chains or transformer tapping cannot offer today the mandatory level of stability and adjustability requested for an optimum beam focalization. The new focusing mask for this picture tube requires therefore an additional high voltage transformer or another high voltage supply to provide the additional grid voltage.

SUMMARY OF THE INVENTION

It is the object of the present invention to provide a high voltage supply for a picture tube having a stable DC output voltage, which is higher than the anode voltage of a picture tube, and which is preferably adjustable.

This object is achieved by means of the features of the invention as specified in claim 1 with respect to a high voltage supply, and in claim 7 with respect to a high voltage module. Advantageous developments of the invention are specified in the subclaims.

According to the invention, the high voltage supply for a picture tube comprises a high voltage transformer, which generates the anode voltage for the picture tube, and a high voltage module having a switched mode power supply for providing a grid voltage, which is higher than the anode voltage. This is provided in that the output of the high voltage transformer is coupled to the transformer of the switched mode power supply, for adding the output voltage of the switched mode power supply to the high voltage of the high voltage transformer.

Advantageously, the transformer of the switched mode power supply provides the high voltage isolation, and at least the high voltage part of the module including the transformer is potted with a resin. To provide an isolation between the transformer of the switched mode power supply and the high voltage transformer, the high voltage of the high voltage transformer is coupled via a diode to one end of the secondary winding of the transformer. The other end of the secondary winding is coupled via a further diode to a capacitor, which is arranged in parallel to the secondary winding, for providing the required stabilized output voltage. The high voltage module provides preferably also an output for a connection to the anode of the picture tube, so that the module can be used with present high voltage transformers, without requiring any modification.

The primary side of the switched mode power supply comprises a control stage with adjustable means for setting a specific output voltage of the module. In a preferred embodiment, this voltage is adjustable between 300 and 500 Volts, with regard to the high voltage of the high voltage transformer. The regulation is preferably provided by means of an auxiliary winding located at the primary side of the power supply, so that no further high voltage isolating parts are required. As the input voltage of the switched mode power supply, the system voltage, which is already available in a television receiver for the deflection stage, can be used.

BRIEF DESCRIPTION OF THE DRAWINGS

The invention is now explained in more detail with reference to schematic drawings, showing a preferred embodiment.

DETAILED DESCRIPTION

Figure 1:
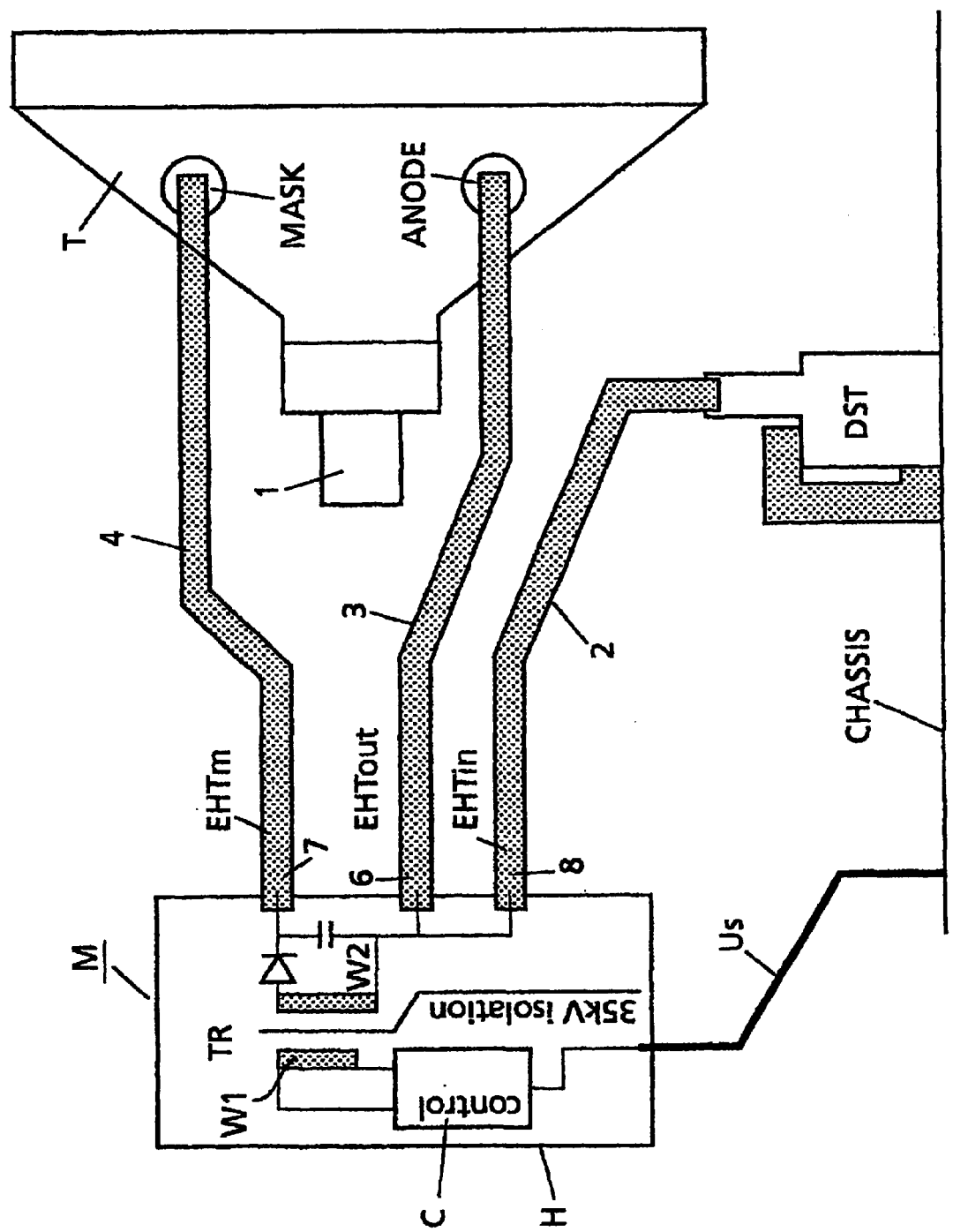
FIG. 1 a high voltage supply with a high voltage transformer and a high voltage module for providing voltages for a picture tube, and FIG. 2 a switched mode power supply being arranged within the high voltage module.

In FIG. 1 a high voltage supply is shown providing an anode voltage EHTout, and a focusing grid voltage EHTm for a picture tube T, which is higher than the anode voltage EHTout. As known, a picture tube within a television receiver or a computer monitor has a main socket 1, to which a so called CRT module is hooked up, which provides the RGB video signals as well as heater voltages, a focus voltage and grid voltages. The anode inside the picture tube T is provided separately via a high voltage cable 3 with the respective high voltage, which is in the range of 20 up to 35 kVolts for color picture tubes. This voltage is supplied by a high voltage transformer DST, arranged on a printed circuit board CHASSIS of the respective television receiver or monitor.

New picture tubes for television sets, which have a higher light output with regard to a respective electron beam power, have an additional focusing mask, which requires a voltage being higher than the anode voltage. According to the invention, the high voltage supply comprises an additional high voltage module M having a switched mode power supply with an input 8 for a transformer TR, to which the high voltage of the high voltage transformer DST is coupled via a high voltage cable 2. The high voltage of the transformer DST is applied particularly to a secondary output winding W2 of the transformer TR, so that the output voltage of the switched mode power supply is added to the high voltage of the high voltage transformer DST to provide a respective mask voltage EHTm at an output 7 of the high voltage module M being higher than the anode voltage EHTin.

In this embodiment, the high voltage for the anode is provided also by the high voltage module M. This is arranged in that the high voltage EHTin from the input 8 is connected to an output 6, for coupling the high voltage EHTout via a high voltage cable 3 to an anode terminal ANODE of the picture tube T. For the high voltage transformer DST therefore no additional output terminal is necessary. The high voltage output 7 is coupled via a high voltage cable 4 to a terminal MASK of the picture tube T, which is connected to the focusing mask.

Because the input voltage Us is provided by the circuit board CHASSIS, a high voltage isolation is necessary within the switched mode power supply. This is provided in this embodiment by the transformer TR, which provides a 35 kV isolation between the primary winding W1 and the secondary winding W2. The switched mode power supply is arranged therefore on a printed circuit board inside a housing H, and potted with a resin to avoid any corona effects.

In another preferred embodiment, only the high voltage part is potted with resin to provide the high voltage isolation, which is therefore the transformer TR with the. output part of the switched mode power supply. The primary side of the switched mode power supply needs not to be potted, which has the advantage that the control part C of the switched mode power supply is easily accessible for adjusting of the output voltage EHTm. The potting with resin can be provided also without requiring an additional housing.

Figure 2:
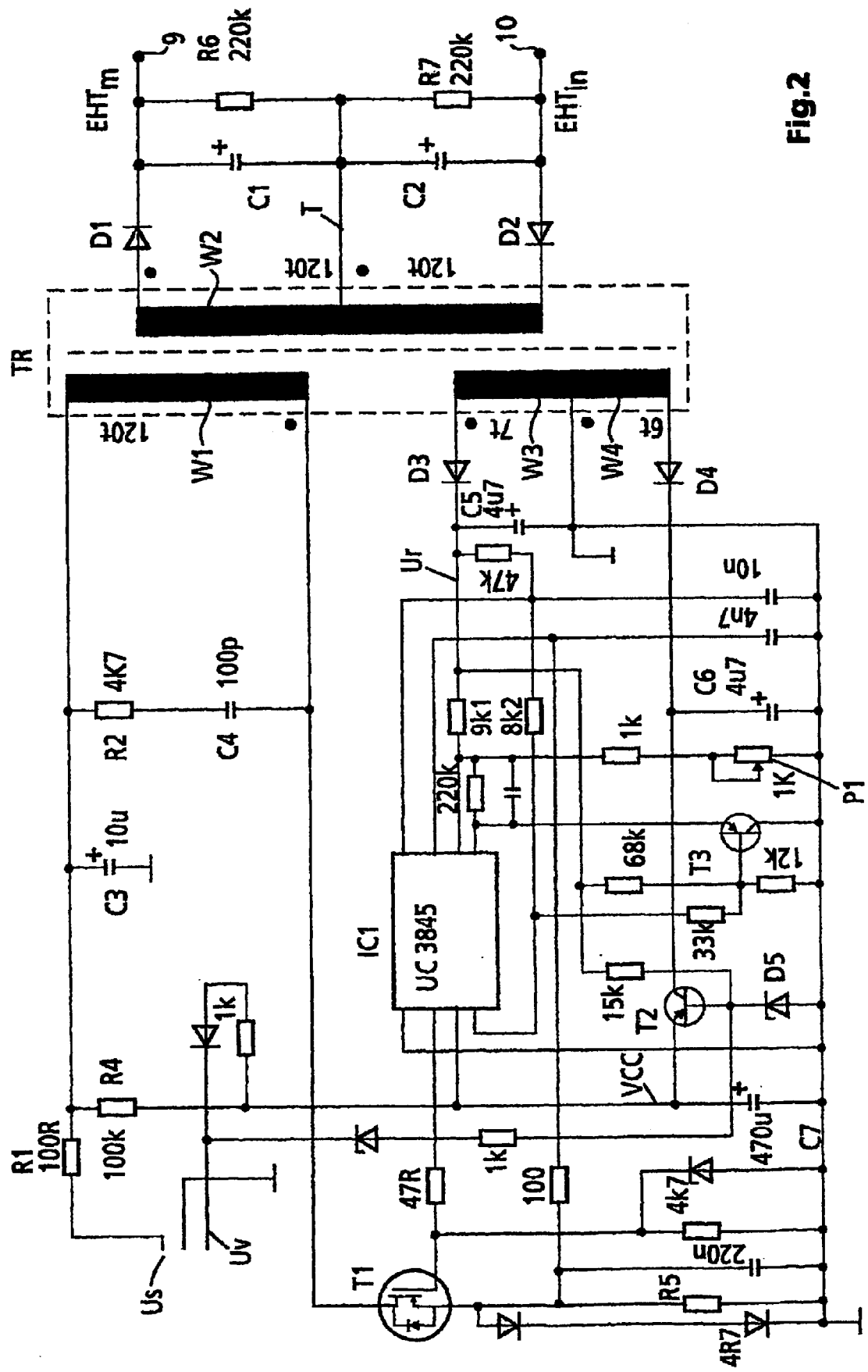

The switched mode power supply of the module M is now explained in detail with regard to FIG. 2. The transformer TR comprises a primary winding W1 and an auxiliary winding W3 on the primary side, and a secondary winding W2 at the secondary side of the switched mode power supply. The primary winding W1 is coupled via an input resistor R1, or a fuse element, to a stabilized system voltage Us, which is available in a television receiver for the supply of the deflection stage. After the input resistor R1 a charge capacitor C3 is arranged for a smoothing of the input voltage.

The other end of the primary winding W1 is connected to a switching transistor T1, which is driven by a control circuit comprising an integrated circuit IC1. The regulating information for stabilizing the output voltage EHTm is provided by the auxiliary winding W3. As the integrated circuit IC1 for example the type UC 3845 is used, which is a fixed frequency current mode PWM controller, and which is working in this embodiment as a flyback converter. Only a small snubber network with a resistor R2 and a capacitor C4 is necessary to reduce voltage peaks, when the switching transistor T1 closes.

Via a diode D3 a voltage information from the auxiliary winding W3 is provided during the flyback phase, and smoothed via a capacitor C5 for providing a regulating voltage Ur for the integrated circuit IC1. Via a voltage divider comprising a potentiometer P1, the output voltage EHTm can be adjusted.

The supply voltage VCC is provided by an auxiliary winding W4 via a diode D4 during the forward phase, and which is regulated via a Zener diode D5 and a transistor T5, and stabilized via capacitors C6 and C7. In a further embodiment the winding W4 has been avoided, and the low supply voltage VCC (i.e. 13V) for the integrated circuit IC1 is taken from the Uv input voltage (positive vertical stage supply voltage) which is used as an inhibiting signal in case of no scanning/deflection.

As a further regulating information a current sensing resistor R5 is used, which is arranged in series to the switching transistor T1. For the start-up of the switched mode power supply, a resistor R4 is used, which couples the voltage from the capacitor C3 to capacitor C7. The capacitor C7 is large enough to supply the integrated circuit IC1 during the start-up with the necessary current, until the supply voltage VCC is provided from the auxiliary winding W3 via the transistor T2. Further information, which voltages have to be applied to the integrated circuit IC1 is known according to prior art and can be found for example in application sheets of the integrated circuit.

For the switched mode power supply therefore only standard parts are required, except the transformer TR, which has to provide the 35 kV high voltage isolation. In this embodiment two auxiliary windings W3 and W4 are used to provide via diode D3 in flyback mode the regulating information Ur, and via diode D4 in forward mode the supply voltage VCC. The winding W3 can also be used to deliver the VCC voltage, but this alternative shows a strong deterioration of the regulation behaviour. The switched mode power supply can be switched off, respectively switched on, via a voltage Uv, which is applied to capacitor C7 and to transistor T2.

The secondary winding W2, which provides the high voltage isolation, is coupled with one end via a diode D2 to the high voltage input 10 to the voltage EHTin and with the other end via a diode D1 to the high voltage output EHTm. The diodes D1 and D2 are arranged in flyback configuration, which charge therefore the capacitors C1 and C2 during the flyback phase. In order to reduce the voltage constraints over the diodes and capacitors and to be able to use film capacitors for potting reasons, the winding W2 is splitted by a tap T into two windings in series, to which two capacitors C1 and C2 are arranged in parallel. Also arranged in parallel are two resistors R6 and R7, used to discharge the capacitors C1 and C2 at switch-off, and which further provide a minimum load for voltage stability, and absorb any possible leakage current.

With this arrangement, the output voltage of the switched mode power supply is added to the input voltage applied at ETHin, for generating the respective high voltage EHTm for the focusing mask. The output voltage of the secondary winding W2 can be adjusted by the winding ratio of windings W1 and W2, which has in this embodiment 120 turns for winding W1 in relation to 2×120 turns for winding W2. Due to the splitted winding W2, conventional capacitors C1 and C2 can be used, high voltage capacitors are not necessary.

Because the output current of the power supply is low, the module with the power supply can be arranged in a very compact manner. A flyback converter is preferable, but other switched mode power supply concepts might be used also for the high voltage module. According of the turns ratio of windings W1 and W2 and the regulation loop at the primary side, a regulated output voltage can be provided, which is adjustable between 300 und 500 Volts, with respect to the input voltage EHTin applied at input 8.

What is claimed is:

1. High voltage supply for a picture tube, comprising a high voltage transformer for providing an anode of the picture tube with a voltage, the picture tube (T) comprising a grid requiring a voltage being higher than the anode voltage, wherein that the high voltage supply comprises further a module with a switched mode power supply for providing the grid voltage, said switched mode power supply comprising a transformer, which is coupled to the output of the high voltage transformer.

2. High voltage supply according to claim 1, wherein said transformer comprises a primary winding and a secondary winding with a high voltage isolation, and that the high voltage from the high voltage transformer is coupled to one end of the secondary winding of said transformer.

3. High voltage supply according to claim 1, wherein at least the high voltage part of said module including the transformer is potted with a resin.

4. High voltage supply according to claim 1, wherein the module comprises an output for providing the anode voltage of the picture tube.

5. High voltage supply according to claim 1, wherein the primary winding of the transformer is coupled to a system voltage of a television receiver, which voltage provides also the start-up voltage for the switched mode power supply.

6. High voltage supply according to claim 1, wherein the high voltage of the high voltage transformer is coupled via a first diode to one end of the secondary winding of the transformer, and the other end of the secondary winding is coupled via a second diode to a capacitor for providing a stabilized output voltage.

7. High voltage module providing a high voltage for a picture tube T, wherein it comprises a switched mode power supply with a transformer having a primary winding and a secondary winding, the secondary winding being provided with an input for a high voltage supply and the other end of the secondary winding being coupled to an output for providing said high voltage, that the transformer provides a high voltage isolation, and that at least the high voltage part of the power supply is potted with a resin.

8. High voltage supply according to claim 7, wherein the high voltage of a high voltage transformer is coupled via a first diode to one end of the secondary winding of the transformer, and the other end of the secondary winding is coupled via a second diode to a capacitor for providing a stabilized output voltage for a focusing grid of the picture tube.

9. High voltage supply according to claim 7, wherein the switched mode power supply is a flyback converter comprising an auxiliary winding on the primary side for output voltage regulation.

10. High voltage supply according to claim 9, wherein the auxiliary winding is coupled with one end to a third diode for providing a regulation information during the flyback phase, and is coupled with another end to a fourth diode for providing a supply voltage during the forward phase of the switched mode power supply.

* * * * *